United States Patent
Shroff et al.

(10) Patent No.: US 9,741,100 B2
(45) Date of Patent: *Aug. 22, 2017

(54) OPTIMIZATION OF PLENOPTIC IMAGING SYSTEMS

(71) Applicants: Sapna A. Shroff, Menlo Park, CA (US); Kathrin Berkner, Los Altos, CA (US); Lingfei Meng, Redwood City, CA (US)

(72) Inventors: Sapna A. Shroff, Menlo Park, CA (US); Kathrin Berkner, Los Altos, CA (US); Lingfei Meng, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/225,397

(22) Filed: Mar. 25, 2014

(65) Prior Publication Data

US 2014/0241615 A1    Aug. 28, 2014

Related U.S. Application Data

(63) Continuation of application No. 13/398,813, filed on Feb. 16, 2012, now Pat. No. 8,761,534.

(51) Int. Cl.
| | |
|---|---|
| G06K 9/00 | (2006.01) |
| G06T 5/00 | (2006.01) |
| G02B 3/00 | (2006.01) |
| G06T 1/00 | (2006.01) |
| G02B 7/38 | (2006.01) |
| H04N 5/232 | (2006.01) |

(52) U.S. Cl.
CPC ............ *G06T 5/003* (2013.01); *G02B 3/0043* (2013.01); *G06T 1/0007* (2013.01); *G02B 3/0056* (2013.01); *G02B 7/38* (2013.01); *H04N 5/23229* (2013.01)

(58) Field of Classification Search
None
See application file for complete search history.

(56) References Cited

U.S. PATENT DOCUMENTS

| | | | |
|---|---|---|---|
| 7,949,252 B1 * | 5/2011 | Georgiev | ........... H04N 13/0228 396/334 |
| 8,228,417 B1 * | 7/2012 | Georgiev | ............... G03B 11/00 348/335 |

(Continued)

FOREIGN PATENT DOCUMENTS

WO    WO 2010/103527 A2    9/2010

OTHER PUBLICATIONS

Knoblauch, Daniel et al. "Factorization of Correspondence and Camera Error for Unconstrained Dense Correspondence Applications." ISVC (2009), pp. 1-10.*

(Continued)

*Primary Examiner* — Vu Le
*Assistant Examiner* — Samah Beg
(74) *Attorney, Agent, or Firm* — Fenwick & West LLP

(57) ABSTRACT

The spatial resolution of captured plenoptic images is enhanced. In one aspect, the plenoptic imaging process is modeled by a pupil image function (PIF), and a PIF inversion process is applied to the captured plenoptic image to produce a better resolution estimate of the object.

20 Claims, 5 Drawing Sheets

(56) References Cited

U.S. PATENT DOCUMENTS

| | | | | |
|---|---|---|---|---|
| 8,315,476 | B1* | 11/2012 | Georgiev | H04N 5/23232 348/207.99 |
| 8,345,144 | B1* | 1/2013 | Georgiev | G03B 11/00 348/335 |
| 8,811,769 | B1* | 8/2014 | Pitts | G06T 3/40 382/275 |
| 2002/0008917 | A1* | 1/2002 | Daniell | G02B 3/005 359/622 |
| 2004/0189686 | A1* | 9/2004 | Tanguay, Jr. | G06Q 40/08 715/716 |
| 2008/0266655 | A1 | 10/2008 | Levoy et al. | |
| 2009/0295829 | A1 | 12/2009 | Georgiev et al. | |
| 2010/0026852 | A1* | 2/2010 | Ng | G02B 3/0056 348/239 |
| 2011/0122394 | A1* | 5/2011 | Kawashima | G03F 7/70083 355/77 |
| 2012/0300091 | A1* | 11/2012 | Shroff | H04N 5/23212 348/222.1 |
| 2013/0128068 | A1* | 5/2013 | Georgiev | H04N 5/23229 348/222.1 |
| 2013/0128087 | A1* | 5/2013 | Georgiev | H04N 5/2254 348/307 |
| 2013/0216123 | A1* | 8/2013 | Shroff | G02B 3/0043 382/154 |
| 2013/0216125 | A1* | 8/2013 | Shroff | H04N 5/2254 382/154 |
| 2016/0099429 | A1* | 4/2016 | Bruder | H01L 27/307 348/374 |
| 2016/0119606 | A1* | 4/2016 | Horikawa | H04N 13/0011 348/46 |

OTHER PUBLICATIONS

McMillan et al. "Plenoptic Modeling: An Image-Based Rendering System," Annual Conference on Computer Graphics—SIGGRAPH, 1995, pp. 39-46.*

Bishop, T. et al., "Light Field Superresolution," 2009 IEEE International Conference on Computational Photography (ICCP), 2009, pp. 1-9.

Donatelli, M. et al., "Anti-Reflective Boundary Conditions and Re-Blurring," Inverse Problems, 2005, pp. 169-182, vol. 21.

Fawzy, Y. et al., "In Vivo Assessment and Evaluation of Lung Tissue Morphologic and Physiological Changes from Non-Contact Endoscopic Reflectance Spectroscopy for Improving Lung Cancer Detection," Journal of Biomedical Optics, Jul./Aug. 2006, pp. 044003-1-044003-12, vol. 11, No. 4.

Park, J. et al., "View Image Generation in Perspective and Orthographic Projection Geometry Based on Integral Imaging," Optics Express, Jun. 9, 2008, pp. 8800-8813, vol. 16.

United States Office Action, U.S. Appl. No. 13/398,813, Jun. 18, 2013, 17 pages.

* cited by examiner

150 Object (ξ,η)
110 Primary lens (x,y)
120 Lenslet Array (u,v)
130 Sensor (t,w)

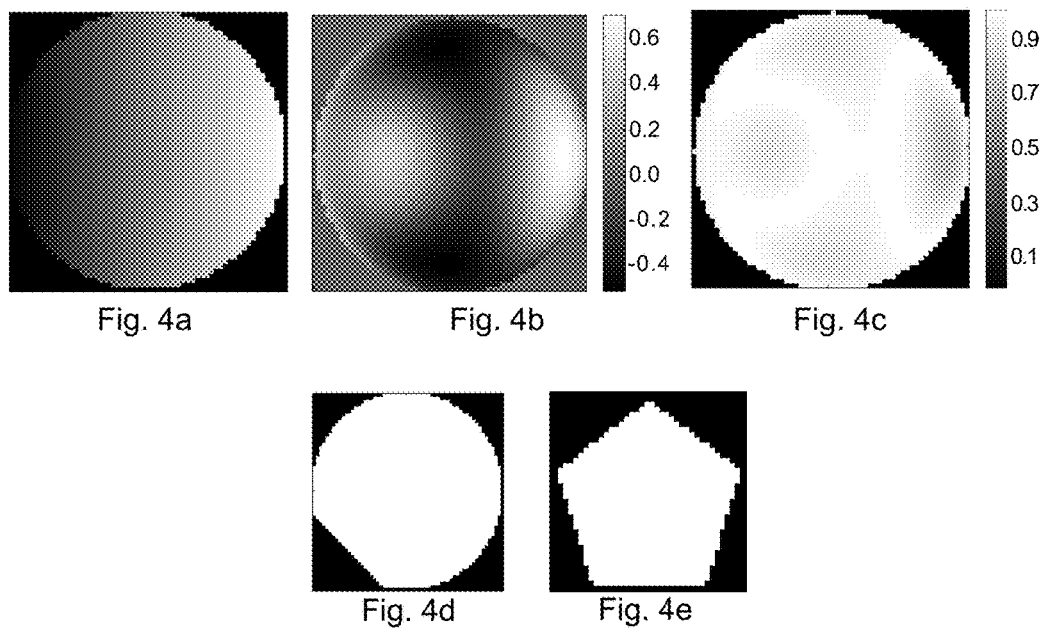
Fig. 4a  Fig. 4b  Fig. 4c
Fig. 4d  Fig. 4e
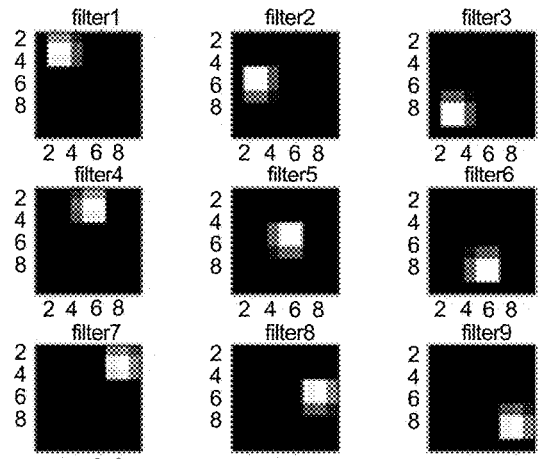
Fig. 5
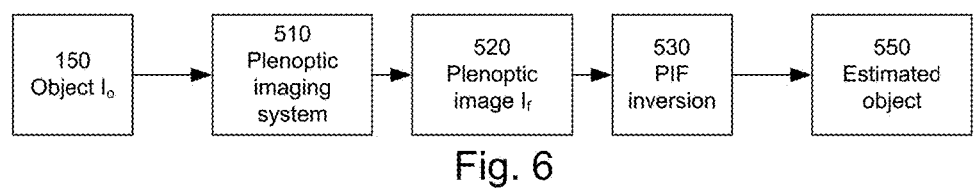
Fig. 6

OPTIMIZATION OF PLENOPTIC IMAGING SYSTEMS

CROSS-REFERENCE TO RELATED APPLICATION(S)

This application is a continuation of U.S. patent application Ser. No. 13/398,813, "Design and optimization of plenoptic imaging systems," filed Feb. 16, 2012. The subject matter of all of the foregoing is incorporated herein by reference in its entirety.

BACKGROUND OF THE INVENTION

1. Field of the Invention

This invention relates generally to plenoptic imaging systems, and more particularly to reconstruction of images and image components in plenoptic imaging systems.

2. Description of the Related Art

The plenoptic imaging system has recently received increased attention. It can be used to recalculate a different focus point or point of view of an object, based on digital processing of the captured plenoptic image. The plenoptic system also finds application in multi-modal imaging, using a multi-modal filter array in the plane of the pupil aperture. Each filter is imaged at the sensor, effectively producing a multiplexed image of the object for each imaging modality at the filter plane. Other applications for plenoptic imaging systems include varying depth of field imaging and high dynamic range imaging.

However, a plenoptic imaging system is not designed to capture a high fidelity image of the object. Rather, the "image" captured by a plenoptic system is intentionally scrambled in a manner that allows the capture of additional lightfield information, but at the expense of image resolution. The loss of spatial resolution is a well-recognized and debilitating drawback of plenoptic imaging systems. A lenslet array at the conventional image plane spreads light on to the sensor. Therefore each image of a given modality (such as each refocused image, or each wavelength image in multispectral imaging, etc.) is restricted to as many pixels as there are lenslets.

Thus there is a need for approaches to combat this loss of spatial resolution.

SUMMARY OF THE INVENTION

The present invention overcomes various limitations by providing approaches to enhance the spatial resolution based on captured plenoptic images. In one aspect, the plenoptic imaging process is modeled by a pupil image function (PIF), which relates the object to the plenoptic image formed by that object. Given the PIF, a better resolution estimate of the object can then be calculated from the captured plenoptic image by effectively inverting the PIF operation (although this may be achieved without actually inverting the PIF function).

In one implementation, the plenoptic imaging process is modeled as a vector-matrix operation $[Iv_f]=[PIFv][Iv_o]$, where $[Iv_o]$ is a vector representing the object (of different components in the object), [PIFv] is a matrix representing the PIF and $[Iv_f]$ is a vector representing the captured plenoptic image. Often, the dimension of the object vector $Iv_o$ is much larger than that of the plenoptic image vector $Iv_f$, especially if the object vector $Iv_o$ represents multiple components within the object, for example from different modalities. That means the [PIFv] matrix is a rectangular matrix, for which no inverse matrix exists. However, the object vector can be estimated from the captured plenoptic image vector by solving a linear inverse problem, namely, computing an estimate $[I^*v_o]$, such that the reconstruction error $\|[PIFv][I^*v_o]-[Iv_f]\|$ is minimized. This will be referred to as PIF inversion.

Such linear inverse problems can be formulated and solved in various ways. For example, different distance measures may be used for the error calculation. Constraints on the object vector may be included as part of the minimization process. For example, if the object vector is composed of different components of the object (e.g., red, green and blue components of the object), the various components may have known relations to each other which could be enforced by using constraints in the minimization process. Different optimization techniques may be used to solve the minimization problem. Design choices of the matrix [PIFv] and selection of the optimization solving technique influence the quality of the estimated object vector $[I^*v_o]$. In one approach, the individual lenslets in the lenslet array in the plenoptic imaging system are non-centrosymmetric in order to improve the behavior of the inversion problem.

The PIF can be estimated or approximated using different approaches. A wave propagation approach is more accurate and includes diffraction effects. A geometrical optics approach is faster. The PIF may also be obtained by measurement of the optical response at the detector.

In another aspect, a resolution-enhanced plenoptic imaging system includes a conventional plenoptic imaging system coupled to digital signal processing that performs the PIF inversion calculation.

The basic PIF model described above can also be used for purposes besides increasing the resolution of a captured plenoptic image. For example, the same basic principles can be used to assist in the design of these systems, to calibrate or test these systems, or to provide real-time automatic adjustments of these systems.

Other aspects of the invention include methods, devices and systems corresponding to the concepts described above.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 4a-e illustrate asymmetrical lenslets.

FIG. 5 illustrates portions of a PIFv matrix for an object with multiple spectral components.

FIG. 6 is a block diagram illustrating object reconstruction.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Sample Configuration.

Figure 1:
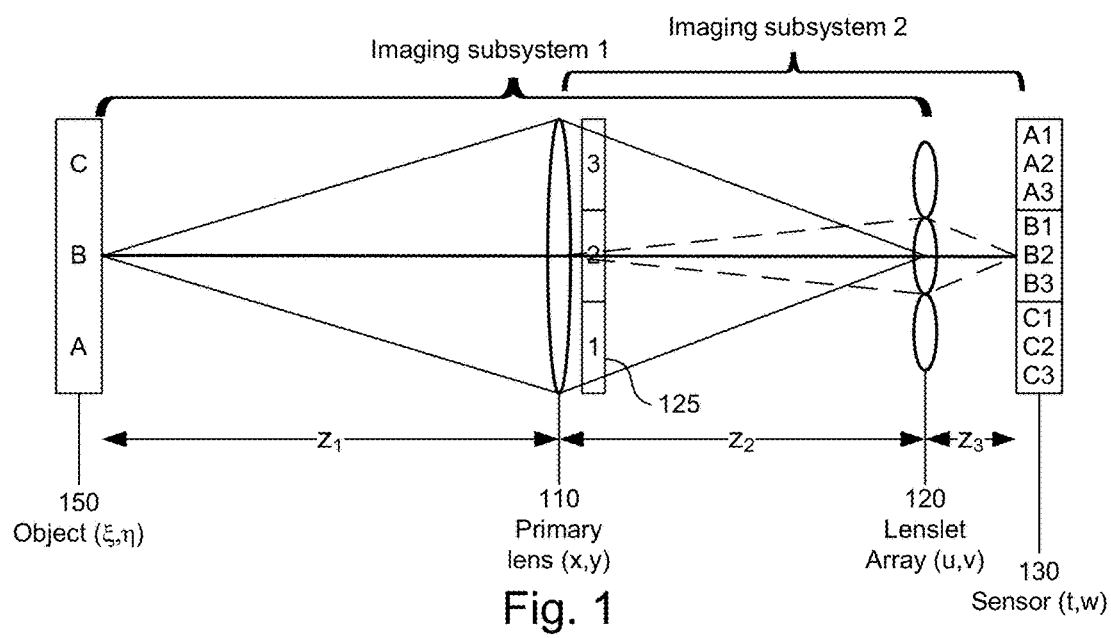
FIG. 1 is a simplified diagram of a plenoptic imaging system.

FIG. 1 is a simplified diagram of a plenoptic imaging system. The system includes a primary imaging subsystem 110 (represented by a single lens in FIG. 1), a secondary imaging array 120 (represented by a lenslet array) and a sensor array 130. These form two overlapping imaging subsystems, referred to as subsystem 1 and subsystem 2 in FIG. 1. The plenoptic imaging system optionally may have a filter module 125 positioned at a location conjugate to the sensor array 130. The filter module contains a number of spatially multiplexed filter cells, labeled 1-3 in FIG. 1. For example, the filter cells could correspond to different modalities within the object.

The spatial coordinates ($\xi$, $\eta$) will be used at the object plane, (x, y) at the pupil plane for imaging subsystem 1, (u, v) at the plane of the lenslet array, and (t, w) at the sensor plane. The primary lens is a distance $z_1$ from the object, the lenslet array is a distance $z_2$ from the primary lens, and the sensor is a distance $z_3$ from the lenslet array. In FIG. 1, the different components are each located at a single plane so the distances between components is easy to define. However, in other systems, the different components may be more complex (e.g., the primary "lens" may be a set of lenses), but the concept of the distances $z_1$, $z_2$, $z_3$ can be generalized using known principles. The focal lengths of the primary lens and the lenslet array are represented by $f_1$ and $f_2$ and their diameters are $D_1$ and $D_2$, respectively. In addition, the different components do not have to be designed exactly as shown in FIG. 1. For example, the "primary lens" could be various combinations of elements, including lenses, mirrors and combinations of the two. Similarly, the secondary imaging array could be a pinhole array, or a reflective array.

Ignoring the filter module 125 for the moment, in imaging subsystem 1, the object 150 is imaged by the primary lens 110 to produce an image that will be referred to as the "primary image." This primary lens 110 may be a camera imaging lens, microscope objective lens or any other such imaging system. The lenslet array 120 is placed approximately at the location of the primary image. Each lenslet then images the pupil of the primary lens to the sensor plane. This is imaging subsystem 2, which partially overlaps with imaging subsystem 1. The image created at the sensor array 130 will be referred to as the "plenoptic image" in order to avoid confusion with the "primary image." The plenoptic image can be divided into an array of subimages, corresponding to each of the lenslets. Note, however, that the subimages are images of the pupil of imaging subsystem 1, and not of the object 150. In FIG. 1, the plenoptic image and subimages are labeled A1-C3. A1 generally corresponds to portion A of the object 150, as filtered by filter cell 1 in the filter module 125.

Figure 2A:
FIGS. 2a-b illustrate the loss of resolution in a plenoptic imaging system.
Figure 2B:
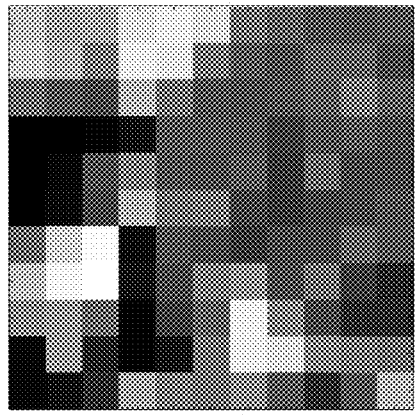

FIGS. 2a-b illustrate the loss of resolution in a plenoptic imaging system (without filter module 125). In this simulation, FIG. 2a shows the object 150 and FIG. 2b shows the corresponding plenoptic image. The conventional plenoptic image here has been obtained by simulating data captured behind every lenslet and binning all of that light into one pixel to give an in-focus image of the object. The plenoptic imaging system uses an 11×11 lenslet array 120. Note that the plenoptic image basically has an 11×11 resolution, determined by the lenslet array, even though there are many more than 11×11=121 sensors in the array 130. The captured plenoptic image (at sensor 130) is not a high fidelity reconstruction of the object 150, even if the primary image incident on the lenslet array 120 were a perfect reconstruction of the object. The loss of spatial resolution is inherent to plenoptic imaging systems.

Image Reconstruction.

Even though this loss of spatial resolution is inherent to plenoptic imaging systems, one of our insights is that the plenoptic image can be processed in a way to reconstruct a higher fidelity image of the object. For example, we will show that the plenoptic imaging system can be modeled by $$\begin{bmatrix} I_f^{1,1} \\ I_f^{1,2} \\ \vdots \\ I_f^{1,W} \\ I_f^{2,1} \\ \vdots \\ I_f^{T,W} \end{bmatrix} = \begin{bmatrix} PIF_{1,1}^{1,1} & PIF_{1,2}^{1,1} & \vdots & \vdots & PIF_{M,N}^{1,1} \\ PIF_{1,1}^{1,2} & PIF_{1,2}^{1,2} & \vdots & \vdots & PIF_{M,N}^{1,2} \\ \vdots & \vdots & \vdots & \vdots & \vdots \\ PIF_{1,1}^{1,W} & PIF_{1,2}^{1,W} & \vdots & \vdots & PIF_{M,N}^{1,W} \\ PIF_{1,1}^{2,1} & PIF_{1,2}^{2,1} & \vdots & \vdots & PIF_{M,N}^{2,1} \\ \vdots & \vdots & \vdots & \vdots & \vdots \\ PIF_{1,1}^{T,W} & PIF_{1,2}^{T,W} & \vdots & \vdots & PIF_{M,N}^{T,W} \end{bmatrix} \begin{bmatrix} I_{o,1,1} \\ I_{o,1,2} \\ \vdots \\ I_{o,2,1} \\ I_{o,2,2} \\ \vdots \\ I_{o,M,N} \end{bmatrix} \quad (1A)$$

where $I_f^{T,W}$ is the intensity at sensor element T,W; $I_{O,M,N}$ is the intensity from object element M,N; and $PIF_{M,N}^{T,W}$ is the plenoptic imaging system response, which we refer to as the pupil image function or PIF. T,W is the discretized version of sensor coordinates (t,w) and M,N is the discretized version of object coordinates ($\xi,\eta$).

Eq. 1A can be written more compactly as $$[Iv_f] = [PIFv][Iv_o] \quad (1B)$$

where the additional "v" indicates that these are based on vectorized images. That is, the two-dimensional plenoptic image $I_f$ is represented as a one-dimensional vector $Iv_f$. Similarly, the two-dimensional object $I_o$ is represented as a one-dimensional vector $Iv_o$. Correspondingly, the four-dimensional PIF is represented as a two-dimensional matrix PIFv.

The PIF can be calculated and approximated in different ways. We provide two examples in the Appendix. Appendix A approximates a PIF based on wave propagation. Appendix B approximates a PIF based on geometrical optics.

Based on Eq. 1B, an estimate $[I^*v_o]$ of the object can be calculated by solving the following optimization problem:

$$\min_{Iv_o} \|[PIFv][Iv_o] - [Iv_f]\|, \text{ subject to constraints on } [Iv_o] \quad (2)$$

The solution to this problem may be implemented as a closed-form solution or via iterative algorithms, depending on the choice of the norm (or combination of norms) $\|.\|$ and the constraints on $[Iv_o]$.

The following are some examples. For the problem $\min_{Ivo}\|[PIFv][Iv_o]-[Iv_f]\|_2^2$ with no additional constraints on $[Iv_o]$, the solution is the least-squares solution $[I^*v_o]=[PIF^*v][Iv_f]$, where $[PIF^*v]$ is the pseudo-inverse of $[PIFv]$, and $\|.\|_2$ is the Euclidean norm. For the problem $\min_{Ivo}\|[PIFv][Iv_o]-[Iv_f]\|_2^2+\|[\Gamma][Iv_o]\|_2^2$ with regularization matrix $\Gamma$ (Tikhonov regularization problem), the Tikhonov matrix $([PIFv]^T[PIFv]-[\Gamma]^T[\Gamma])^{-1}[PIFv]^T Iv_f$ is the solution. For the problem $\min_{Ivo}\|[PIFv][Iv_o]-[Iv_f]\|_2^2$ with upper and lower bounds on individual component of $[Iv_o]$, a least square data fitting algorithm can be applied to calculate a solution. For the sparsity constraint regularization problem $\min_{Ivo}\|[PIFv][Iv_o]-[Iv_f]\|_2^2+\lambda\|[Iv_o]\|_0$, solutions can be obtained via iterative optimization techniques such as Basis Pursuit or Expectation Maximization. For the $L_1$ regularization problem (LASSO) $\min_{Ivo}\|[PIFv][Iv_o]-[Iv_f]\|_2^2+\lambda\|[Iv_o]\|_1$ subject to $\|[Iv_o]\|_1 \le \epsilon$ the solution can be obtained via convex optimization techniques. Other regularization techniques may be used.

Note that the observation vector $[Iv_f]$ in Eq. (1B) is in general not the result of a convolution of the system response matrix with the object vector $[Iv_o]$ and therefore direct deconvolution techniques such as Wiener filtering, etc. are not directly applicable.

The PIFv matrix may be obtained via simulation during system design, or by good calibration of each point in the object in a physical system, or may be an approximation to this response. The PIFv matrix may also be updated with techniques such as regularization, total variation, etc., to incorporate approximations or errors in the knowledge of the PIFv matrix.

Noise in the sensor may lead to the need for regularization in the inversion process. For a scientific sensor such as used in microscopes we expect less noise. In one experiment, we obtained a reconstruction by using Eq. 2 in an iterative least squares curve fit function in Matlab to estimate $[Iv_o]$ from noisy sensor data $[Iv_f]$. We also incorporated a smoothing procedure in every iteration that removes sharp, high frequency variations in the estimates of the object reconstruction. Other variations of this procedure could be used.

Figure 3A:
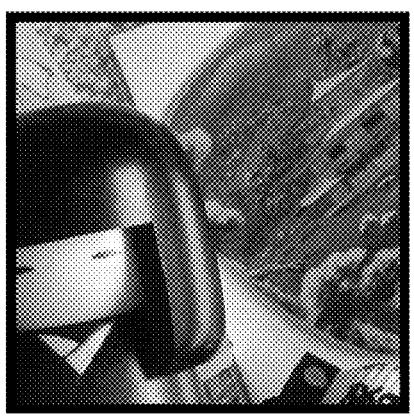
FIGS. 3a-b illustrate spatial reconstruction in a plenoptic imaging system, according to the invention.
Figure 3B:

FIGS. 3a-b illustrate spatial reconstruction, using the technique described above. These use the same object as FIGS. 2a-b. FIG. 3a shows reconstruction in a case without noise. FIG. 3B shows reconstruction using iterative least squares, with SNR=40 dB.

In this example, the object is a 2D object. That is, the object distance is the same for all points in the object. As a result, the whole object should be in-focus, and our corresponding reconstructions are also in-focus. However, the approach described above can also be used to obtain reconstruction for a 3D object for which the object plane is defocused. In that case, some planes intersecting the object will be in-focus and some out-of-focus. If we consider a 3D object where different planes of the object may be in-focus or out-of-focus, then we update the PIFv matrix with the response of object points in x-y as well as z depth. That is, the object vector $[Iv_o]$ would contain multiple components rather than a single object, each representing the component of the object at a depth z. The PIFv matrix would also be expanded to include the contribution to $[Iv_f]$ from each depth component. The PIFv matrix then contains x-y-z calibration and its inversion would give data for a 3D object. Depth information from other sources can be used to reduce the complexity of the inversion of this 3D response matrix.

Conditioning the PIFv Matrix.

Some techniques for calculating the solution of the PIFv inversion problem may not always create useful results, even in the 2D, noise-less case. One common problem is that an erroneous twin-image solution can dominate the reconstruction. The twin-image solution occurs when the reconstructed image is a combination of the object and its twin rotated through 180 degrees.

This could be caused by symmetry in the response for some object points. In a radially symmetric optical system, a given object point almost always has a diametrically opposite object point which gives a flipped version of almost the same optical response (PIF). This means that the coefficients in the PIFv matrix for one object point are almost identical to the coefficients of another object point that is located diametrically opposite in the optical system at the plane of the lenslet. Thus, there is lack of enough diversity or randomness in the coefficients in the PIFv matrix.

This can be addressed by incorporating asymmetry in the response for the object points across a given lenslet. In one approach, we incorporate asymmetry in the shape/extent or amplitude or phase of the lenslets in the lenslet array. FIGS. 4a-e illustrate some examples of asymmetrical lenslets. In FIG. 4a, the shading represents the amplitude response of the lenslet. The absorption varies across the aperture of the lenslet. In FIGS. 4b-c, the shading represents the phase response of the lenslet. This asymmetric phase can be introduced by phase plates or other additional components, or could be the result of aberrations designed into the lenslets. FIGS. 4d-e show two examples of asymmetrically shaped lenslet apertures. In FIG. 4d, the aperture is circular with a flat side. In FIG. 4e, the aperture is a regular polygon with an odd number of sides. The lenslets have some variation (e.g., amplitude, phase or shape of aperture) that makes them less symmetric. All these cases are examples where the lenslet is non-centrosymmetric (i.e., there is no 180 degree rotational symmetry). That is, the (n×n) pupil function matrix P for a lenslet satisfies the condition $P_{i,j} \ne P_{n-i+1, n-j+1}$ for at least one pair (i, j) with $1 \le i, j \le n$. Other forms of asymmetry could be a scratch or a mark or pattern across the face of a lenslet. This asymmetry imparts enough variation in the coefficients in the PIFv matrix to avert the twin-image reconstruction error.

In one approach, the lenslets themselves are not altered. Rather, a filter or mask having amplitude or phase variations are placed in a conjugate object plane in order to implement such an asymmetry/variation in the response.

In a different approach, one could avoid using asymmetric lenslets and instead use advanced image processing algorithms coupled to prior assumptions, such as object statistics or basis representations of objects, etc., to restrict the solution space for the PIF inversion problem. However, this requires making assumptions about the object. These approaches can also be iterative and therefore computationally expensive.

Multiple Object Components

The description above can be used for reconstruction of a single object. In that case, $Iv_o$ represents a single version of the object. For example, $Iv_o$ might represent a grayscale image of the object, where each value in Iv, is the grayscale at a different pixel within the object. The PIF matrix then represents the contribution of each pixel object to the captured plenoptic image.

However, $Iv_o$ and PIFv can also contain different components. For example, $Iv_{o1}$ might be the component of the object at wavelength band 1, $Iv_{o2}$ might be the component of the object at wavelength band 2, and so on. The corresponding "component PIFs" could include $PIFv_1$, $PIFv_2$ and so on, where the component $PIFv_1$ represents the contribution of the component $Iv_{o1}$ to the captured plenoptic image, component $PIFv_2$ represents the contribution of the component $Iv_{o2}$ to the captured plenoptic image, etc. The basic equation $[Iv_f]=[PIFv][Iv_o]$ still holds, except that now the matrix $[PIFv]=[[PIFv_1] \ldots [PIFv_K]]$ and the vector $[Iv_o]=[[Iv_{o1}]^T [Iv_{o2}]^T \ldots [Iv_{oK}]^T]^T$. Eqn. (1B) can then be written as $$[Iv_f]=[[PIFv_1][PIFv_2] \ldots [PIFv_K]][[Iv_{o1}]^T[Iv_{o2}]^T \ldots [Iv_{oK}]^T]^T \quad (3)$$

The components could be based on wavelength, polarization, attenuation, object illumination or depth, for example. Using the notation of Eq. 1A, if $Iv_o$ is a single object, then [PIFv] is a TW×MN matrix. If $Iv_o$ is constructed from K components, then [PIFv] becomes a TW×KMN matrix.

In systems where a filter module 125 is used, the different components might correspond to the different filter cells. In one example application, the filter cells have different spectral responses designed so that the filter module can be used to detect certain substances based on these spectral responses. The object components $Iv_{ok}$ are chosen as the object contributions in each of the spectral regions. The PIF components $PIFv_k$ are then calculated as the system response for each of the spectral regions. Given the captured plenoptic image $Iv_f$, the PIF inversion then yields image estimates for each of the spectral components $Iv_{ok}$. The use of filter cells in the plenoptic imaging system facilitates this process since certain regions of the plenoptic image will be more strongly filtered by one spectral response than another. Constraints on the object components may also be used during the PIF inversion. For example, there may be known correlation between the different spectral components. Alternately, if there is an unfiltered object component, it might be equal to the sum of the other spectral components. Note that Eq. 3 is general enough to account for spatial overlap between the different spectral components.

FIG. 5 illustrates components of a PIFv matrix. In this example, a filter module contains 3×3 filter cells, each with a different spectral response. The object $Iv_o$ is divided into 9 corresponding spectral components. The PIFv matrix then also has nine spectral components $[PIFv_k]$, each of which is a TW×MN matrix. FIG. 5 shows each of the spectral components $[PIFv_k]$, for a single object point (i.e. M=1, N=1) and for a simplified sensor with T=9, W=9. That is, the upper left square shows the contribution to the plenoptic image (i.e., what the sensor detects) from the first spectral component of a single object point. Most of the square is black because all but one of the filter cells blocks this spectral component. The next square shows the contribution to the plenoptic image, from a second spectral component of the same object point. And so on, until the ninth square shows the contribution from the ninth spectral component.

Other Modalities.

The model of Eqs. (1)-(3) can be used in a number of modes. The description above described a situation where the plenoptic imaging system is used in an operational mode (as opposed to a calibration, testing or other mode). A plenoptic image is captured, and the goal is to reconstruct a high quality image of the original object (or of an object component) from the captured plenoptic image. This will be referred to as reconstruction mode. FIG. 6 is a block diagram illustrating a resolution-enhanced plenoptic imaging system used in reconstruction mode. An object 150 is incident on a plenoptic imaging system 510, which captures plenoptic image 520. The image capture process for the plenoptic imaging system is described by a pupil image function (PIF) response. Signal processing 530 is used to invert this process in order to obtain an estimate 550 of the original object/object component.

Figure 7A:
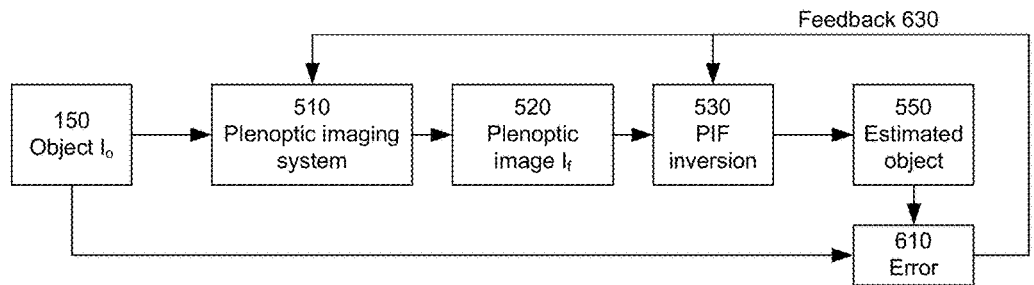
FIGS. 7a-d are block diagrams illustrating different modes using feedback based on error in the object estimate.

FIG. 7a is a block diagram based on the same PIF model, but used in a different manner. In this approach, the object 150 is known (or independently estimated) and the estimated object 550 is compared to the actual object. An error metric 610 is calculated and used as feedback 630 to modify the plenoptic imaging system 510 and/or the inversion process 530.

Figure 7B:
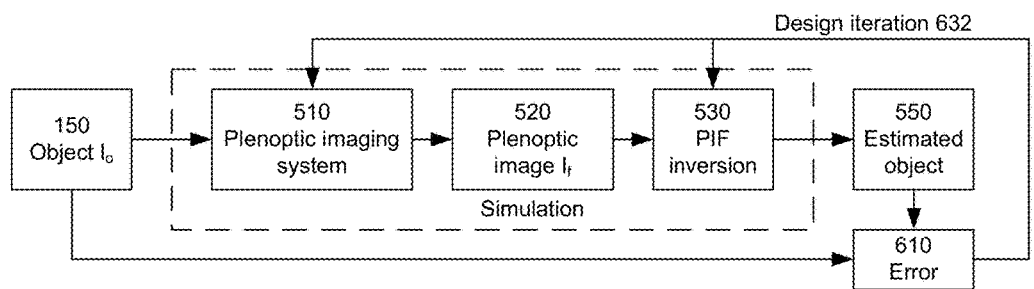

This general model can be used for different purposes. For example, it may be used as part of the design process, as shown in FIG. 7b. In design mode, the plenoptic imaging system 510, captured plenoptic imaging system 520 and signal processing 530 are computer models of the system being designed. The object 150 is also computer simulated. The error metric 610 is used to improve the design. It may also be used as feedback 632 to improve the design of the plenoptic imaging system 510, the signal processing 530 or both. For example, positions, shapes and sizes of various elements in the plenoptic imaging system may be iterated based on the error metric. This includes the size and spacing of the lenslets and sampling at the sensor. The error metric may also be one component of a more inclusive metric. In another example, the filter module in the main lens may be translated in the plane perpendicular to the optical axis such that the amount of light passing through individual filter cells is changes. In a third example, the position of the combined secondary imaging array and the sensor is changed along the optical axis.

Figure 7C:
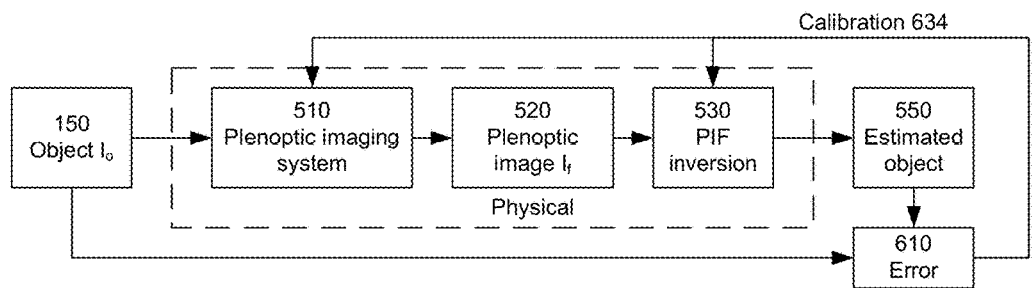

FIG. 7c shows an offline calibration mode. In this mode, the plenoptic imaging system has been designed and built, but is being calibrated. This might occur in the factory or in the field. In this example, the object 150 is a known calibration target. The error metric 610 is used to calibrate 634 the already built plenoptic imaging system 510 and/or signal processing 530. Example adjustments may include adjustments to the physical position, spacing or orientation of components; to timing, gain, or other electronic attributes.

Figure 7D:
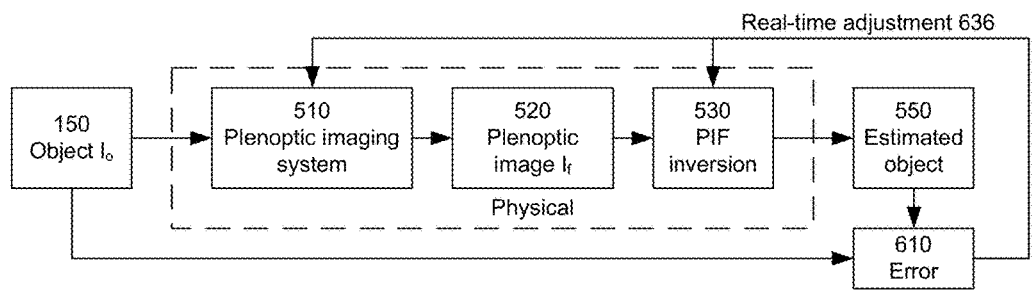

In FIG. 7d, the feedback loop is similar to FIG. 6c, except that it occurs automatically in real-time 636. This would be the case for auto-adjustment features on the plenoptic imaging system.

Figure 8A:
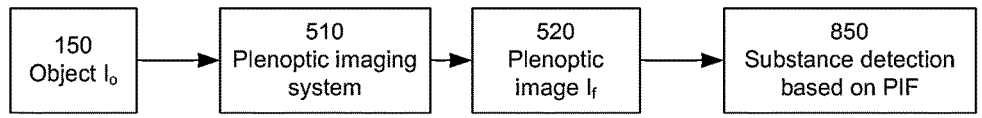
FIGS. 8a-b are block diagrams illustrating PIF inversion used for substance detection and for depth estimation, respectively.
Figure 8B:
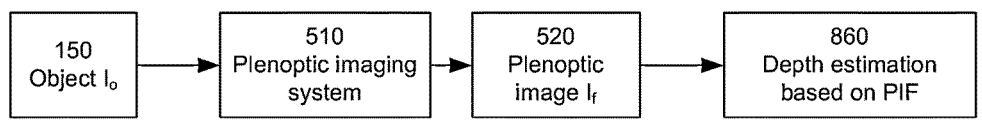

In a last variation, FIGS. 7a-d are based on a metric that compares an estimated object 550 with the actual object 150. However, other metrics for estimating properties of the object can also be used, as shown in FIGS. 8a-b. In addition, the PIF model can be used without having to expressly calculate the estimated object.

In FIG. 8a, the task is to determine whether a specific substance is present based on analysis of different spectral components. For example, the PIF model may be based on these different spectral components, with a corresponding filter module used in the plenoptic imaging system. Conceptually, a PIF inversion process can be used to estimate each spectral component, and these can then be further analyzed to determine whether the substance is present. However, since the end goal is substance detection, estimating the actual $[Iv_{ok}]$ is an intermediate step. In some cases, it may be possible to make the calculation 850 for substance detection without directly estimating the object components. The process shown in FIG. 8a can also be used in the various modalities shown in FIG. 7. For example, the system can be designed, calibrated and/or adjusted to reduce errors in substance detection (as opposed to errors in object estimation). Errors can be measured by the rate of false positives (system indicates that substance is present when it is not) and the rate of false negatives (system indicates that substance is not present when it is), for example.

Two examples of metrics that may be used for object classification are the Fisher discriminant ratio and the Bhattacharyya distance. The Fisher discriminant ratio (FDR) can be used to evaluate the contrast between two object classes. It is defined as $$FDR = (\bar{Y}_1 - \bar{Y}_2)^T (\Sigma_{Y1} + \Sigma_{Y2})^{-1} (\bar{Y}_1 - \bar{Y}_2) \quad (4)$$

where $\bar{Y}_1$ and $\bar{Y}_2$ are the feature means of the two classes to be discriminated and $\Sigma_{Y1}$ and $\Sigma_{Y2}$ are covariance matrices of the two classes.

The Bhattacharyya distance can be used to estimate classification accuracy based on a Bayes classifier. The Bhattacharyya distance is a theoretical value which is often used in an exponential function to estimate the upper bound of classification error. In one approach, a higher order equation is used to estimate the classification error $P_e$ based on the Bhattacharyya distance as shown below:

$$P_e = a_1 - a_2 D_B + a_3 D_B^2 - a_4 D_B^3 + a_5 D_B^4 - a_6 D_B^5 \quad (5)$$

where the coefficients are given by $a_1=40.219$, $a_2=70.019$, $a_3=63.578$, $a_4=32.766$, $a_5=8.7172$, and $a_6=0.91875$. The Bhattacharyya distance can be calculated using $$D_B = \frac{1}{8}(\bar{Y}_1 - \bar{Y}_2)^T \left(\frac{\Sigma_{Y1} + \Sigma_{Y2}}{2}\right)^{-1} (\bar{Y}_1 - \bar{Y}_2) + \frac{1}{2} \ln \frac{\left|\frac{\Sigma_{Y1} + \Sigma_{Y2}}{2}\right|}{|\Sigma_{Y1}|^{1/2} |\Sigma_{Y2}|^{1/2}} \quad (6)$$

A support vector machine (SVM) can be used to estimate the hyperplane separating two classes that simultaneously minimizes the classification error and maximizes the geometric margin.

FIG. 8b gives another example, which is depth estimation. The task here is to determine the depth to various objects. The object components are the portions of the object which are at different depths. The PIF inversion process can then be used, either directly or indirectly, to estimate the different depth components and hence the depth estimates. This metric can also be used in different modalities. FIGS. 8a-b give just two examples. Others will be apparent.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, portions of the invention can be implemented in computer hardware, firmware, software, combinations thereof and other types of processing power. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

In alternate embodiments, portions of the invention can be implemented by modules, which can take different physical forms. The term "module" is not meant to be limited to a specific physical form. Depending on the specific application, modules can be implemented as hardware, firmware, software, and/or combinations of these. For example, the signal processing in FIGS. 6-7 could be implemented as dedicated circuitry (e.g., part of an ASIC), in order to take advantage of lower power consumption and higher speed. In other applications, the modules can be implemented as software, typically running on digital signal processors or even general-purpose processors. Various combinations can also be used. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

APPENDIX A

Example PIF Based on Wave Propagation

This derivation uses the nomenclature shown in FIG. 1 and the corresponding text. Begin with imaging sub-system 1. Let the main lens have a generalized pupil function denoted as $P_1$, with its corresponding impulse response $h_1$:

$$h_1(u, v; \xi, \eta) = \frac{e^{jkz_1}}{\lambda^2 z_1 z_2} \exp\left[\frac{jk}{2z_2}(u^2 + v^2)\right] \exp\left[\frac{jk}{2z_1}(\xi^2 + \eta^2)\right] \quad (A1)$$

$$\iint dx\,dy\, P_1(x, y) \exp\left[\frac{jk}{2}\left(\frac{1}{z_1} + \frac{1}{z_2} - \frac{1}{f_1}\right)(x^2 + y^2)\right]$$

$$\exp\left\{-\frac{jk}{z_2}[(u - M\xi)x + (v - M\eta)y]\right\}$$

where $\lambda$ is the wavelength of imaging, $$k = \frac{2\pi}{\lambda}$$

and the magnification from object to image plane is given by $M = -z_2/z_1$. Now consider the integral in Eq. (A1) as follows, $$\iint dx\,dy\, P_1(x, y) \exp\left[\frac{jk}{2}\left(\frac{1}{z_1} + \frac{1}{z_2} - \frac{1}{f_1}\right)(x^2 + y^2)\right] \quad (A2)$$

$$\exp\left\{-\frac{jk}{z_2}[(u - M\xi)x + (v - M\eta)y]\right\} =$$

$$\iint dx\,dy\, P_1(x, y) \exp\left[\frac{jk}{2}\left(\frac{1}{z_1} + \frac{1}{z_2} - \frac{1}{f_1}\right)(x^2 + y^2)\right]$$

$$\exp\left\{-j2\pi\left[(u - M\xi)\frac{x}{\lambda z_2} + (v - M\eta)\frac{y}{\lambda z_2}\right]\right\}$$

Substituting $x' = x/\lambda z_2$ and $y' = y/\lambda z_2$, the above term becomes $$\lambda^2 z_1 z_2 \iint dx'\,dy'\, P_1(x'\lambda z_2, y'\lambda z_2) \quad (A3)$$

$$\exp\left\{\frac{jk}{2}\left(\frac{1}{z_1} + \frac{1}{z_2} - \frac{1}{f_1}\right)[(x'\lambda z_2)^2 + (y'\lambda z_2)^2]\right\}$$

$$\exp\{-j2\pi[(u - M\xi)x' + (v - M\eta)y']\} =$$

$$\lambda^2 z_1 z_2 FT\bigg(P_1(x'\lambda z_2, y'\lambda z_2) \exp$$

$$\left\{\frac{jk}{2}\left(\frac{1}{z_1} + \frac{1}{z_2} - \frac{1}{f_1}\right)[(x'\lambda z_2)^2 + (y'\lambda z_2)^2]\right\}\bigg)\bigg|_{\substack{fx=(u-M\xi)\\fy=(v-M\eta)}} =$$

$$\lambda^2 z_1 z_2 h'_1(u - M\xi, v - M\eta),$$

where we have defined the term $h'_1$ for convenience as $$h'_1(u, v) = \quad (A4)$$

$$FT\bigg(P_1(x\lambda z_2, y\lambda z_2) \exp\left\{\frac{jk}{2}\left(\frac{1}{z_1} + \frac{1}{z_2} - \frac{1}{f_1}\right)[(x\lambda z_2)^2 + (y\lambda z_2)^2]\right\}\bigg)$$

Eq. (A1) then reduces to $$h_1(u, v; \xi, \eta) = e^{jkz_1} \exp\left[\frac{jk}{2z_2}(u^2 + v^2)\right] \exp\left[\frac{jk}{2z_1}(\xi^2 + \eta^2)\right] \quad (A5)$$

$$h'_1(u - M\xi, v - M\eta)$$

The field of the primary image formed at approximately the plane of the lenslet array is $$U_i(u, v) = \iint d\xi\,d\eta\, h_1(u, v; \xi, \eta) U_o(\xi, \eta) \quad (A6)$$

where $U_0(\xi, \eta)$ is the field of the object. Substituting Eq. (A5) yields $$U_i(u, v) = \quad (A7)$$

$$e^{jkz_1} \exp\left[\frac{jk}{2z_2}(u^2 + v^2)\right] \iint d\xi\,d\eta\, U_0(\xi, \eta) \exp\left[\frac{jk}{2z_1}(\xi^2 + \eta^2)\right]$$

$$h'_1(u - M\xi, v - M\eta)$$

Substituting $\xi' = M\xi$ and $\eta' = M\eta$ in the above equation yields $$U_i(u, v) = \frac{e^{jkz_1}}{M^2} \exp\left[\frac{jk}{2z_2}(u^2 + v^2)\right] \iint d\xi'\,d\eta'\, U_o\left(\frac{\xi'}{M}, \frac{\eta'}{M}\right) \quad (A8)$$

$$\exp\left\{\frac{jk}{2z_1}\left[\left(\frac{\xi'}{M}\right)^2 + \left(\frac{\eta'}{M}\right)^2\right]\right\} h'_1(u - \xi', v - \eta')$$

Now consider propagation from the lenslet array to the sensor. We assume each lenslet has a diameter $D_2$, focal length $f_2$, pupil function given by $P_2$ and there are M×N such lenslets in the array. The amplitude distribution of the field after the lenslet array may be written as $$U'_i(u, v) = U_i(u, v) \sum_m \sum_n P_2(u - mD_2, v - nD_2) \quad (A9)$$

$$\exp\left\{\frac{-jk}{2f_2}[(u - mD_2)^2 + (v - nD_2)^2]\right\}$$

Using Fresnel transformation to propagate this field to the sensor, which is located at a distance $z_3$ from the lenslet array, yields the field of the plenoptic image $U_f$ $$U_f(t, w) = \frac{e^{jkz_3}}{j\lambda z_3} \exp\left[\frac{jk}{2z_3}(t^2 + w^2)\right] \sum_m \sum_n \iint du\,dv\, U_i(u, v) \quad (A10)$$

$$P_2(u - mD_2, v - nD_2)$$

$$\exp\left\{\frac{-jk}{2f_2}[(u - mD_2)^2 + (v - nD_2)^2]\right\}$$

$$\exp\left[\frac{jk}{2z_3}(u^2 + v^2)\right] \exp\left[\frac{-jk}{z_3}(ut + vw)\right]$$

$$= \frac{e^{jkz_3}}{j\lambda z_3} \exp\left[\frac{jk}{2z_3}(t^2 + w^2)\right] \sum_m \sum_n \exp$$

$$\left\{\frac{-jk}{2f_2}[(mD_2)^2 + (nD_2)^2]\right\} \iint du\,dv\, U_1(u, v)$$

$$P_2(u - mD_2, v - nD_2)$$

$$\exp\left[\frac{jk}{2}\left(\frac{1}{z_3} - \frac{1}{f_2}\right)(u^2 + v^2)\right]$$

-continued $$\exp\left\{-jk\left[u\left(\frac{t}{z_3}-\frac{mD_2}{f_2}\right)+v\left(\frac{w}{z_3}-\frac{nD_2}{f_2}\right)\right]\right\}$$

Inserting Eq. (A8) into Eq. (A10) yields $$U_f(t,w) = \frac{e^{jkz_1}e^{jkz_3}}{j\lambda z_3 M^2}\exp\left[\frac{jk}{2z_3}(t^2+w^2)\right] \quad (A11)$$

$$\sum_m \sum_n \exp\left\{\frac{-jk}{2f_2}[(mD_2)^2+(nD_2)^2]\right\}$$

$$\int\int du\,dv\,P_2(u-mD_2, v-nD_2)$$

$$\exp\left[\frac{jk}{2}\left(\frac{1}{z_2}+\frac{1}{z_3}-\frac{1}{f_2}\right)(u^2+v^2)\right]\exp$$

$$\left\{-jk\left[u\left(\frac{t}{z_3}-\frac{mD_2}{f_2}\right)+v\left(\frac{w}{z_3}-\frac{nD_2}{f_2}\right)\right]\right\}$$

$$\int\int d\xi'd\eta'\,U_o\left(\frac{\xi'}{M},\frac{\eta'}{M}\right)\exp$$

$$\left\{\frac{jk}{2z_1}\left[\left(\frac{\xi'}{M}\right)^2+\left(\frac{\eta'}{M}\right)^2\right]\right\}h'_1(u-\xi', v-\eta')$$

Therefore the intensity of this field $U_f$ at the sensor plane is given by $$I_f(t,w) = \langle U_f(t,w;u,v,\xi',\eta')U_f^*(t,w;\tilde{u},\tilde{v},\tilde{\xi}',\tilde{\eta}')\rangle = \quad (A12)$$

$$\left\langle \frac{e^{jkz_1}e^{jkz_3}}{j\lambda z_3 M^2}\exp\left[\frac{jk}{2z_3}(t^2+w^2)\right]\right.$$

$$\sum_m \sum_n \exp\left\{\frac{-jk}{2f_2}[(mD_2)^2+(nD_2)^2]\right\}$$

$$\int\int du\,dv\,P_2(u-mD_2, v-nD_2)$$

$$\exp\left[\frac{jk}{2}\left(\frac{1}{z_2}+\frac{1}{z_3}-\frac{1}{f_2}\right)(u^2+v^2)\right]\exp$$

$$\left\{-jk\left[u\left(\frac{t}{z_3}-\frac{mD_2}{f_2}\right)+v\left(\frac{w}{z_3}-\frac{nD_2}{f_2}\right)\right]\right\}$$

$$\int\int d\xi'd\eta'\,U_o\left(\frac{\xi'}{M},\frac{\eta'}{M}\right)\exp$$

$$\left\{\frac{jk}{2z_1}\left[\left(\frac{\xi'}{M}\right)^2+\left(\frac{\eta'}{M}\right)^2\right]\right\}h'_1(u-\xi', v-\eta')\times$$

$$\left(\frac{e^{-jkz_1}e^{-jkz_3}}{-j\lambda z_3 M^2}\exp\left[-\frac{jk}{2z_3}(t^2+w^2)\right]\right.$$

$$\sum_{\tilde{m}} \sum_{\tilde{n}} \exp\left\{\frac{+jk}{2f_2}[(\tilde{m}D_2)^2+(\tilde{n}D_2)^2]\right\}$$

$$\int\int d\tilde{u}\,d\tilde{v}\,P_2^*(\tilde{u}-\tilde{m}D_2, \tilde{v}-\tilde{n}D_2)$$

$$\exp\left[-\frac{jk}{2}\left(\frac{1}{z_2}+\frac{1}{z_3}-\frac{1}{f_2}\right)(\tilde{u}^2+\tilde{v}^2)\right]$$

$$\exp\left\{+jk\left[\tilde{u}\left(\frac{t}{z_3}-\frac{\tilde{m}D_2}{f_2}\right)+\tilde{v}\left(\frac{w}{z_3}-\frac{\tilde{n}D_2}{f_2}\right)\right]\right\}\int\int d\tilde{\xi}'d\tilde{\eta}'\,U_o^*\left(\frac{\tilde{\xi}'}{M},\frac{\tilde{\eta}'}{M}\right)$$

$$\exp\left\{-\frac{jk}{2z_1}\left[\left(\frac{\tilde{\xi}'}{M}\right)^2+\left(\frac{\tilde{\eta}'}{M}\right)^2\right]\right\}$$

$$h'^*_1(\tilde{u}-\tilde{\xi}', \tilde{v}-\tilde{\eta}')\right\rangle$$

Considering an object creating spatial incoherence in the object field, $$\langle U_o(\xi',\eta')U^*_o(\tilde{\xi}',\tilde{\eta}')\rangle = I_o(\xi',\eta')\delta(\xi'-\tilde{\xi}',\eta'-\tilde{\eta}') \quad (A13)$$

Substituting this into Eq. (A12) yields $$I_f(t,w) = \left|\frac{e^{jkz_1}e^{jkz_3}}{j\lambda z_3 M^2}\exp\left[\frac{jk}{2z_3}(t^2+w^2)\right]\right|^2 \quad (A14)$$

$$\sum_m \sum_n \exp\left\{\frac{-jk}{2f_2}[(mD_2)^2+(nD_2)^2]\right\}$$

$$\int\int du\,dv\,P_2(u-mD_2, v-nD_2)$$

$$\exp\left[\frac{jk}{2}\left(\frac{1}{z_2}+\frac{1}{z_3}-\frac{1}{f_2}\right)(u^2+v^2)\right]\exp$$

$$\left\{-jk\left[u\left(\frac{t}{z_3}-\frac{mD_2}{f_2}\right)+v\left(\frac{w}{z_3}-\frac{nD_2}{f_2}\right)\right]\right\}\times$$

$$\sum_{\tilde{m}} \sum_{\tilde{n}} \exp\left\{\frac{+jk}{2f_2}[(\tilde{m}D_2)^2+(\tilde{n}D_2)^2]\right\}$$

$$\int\int d\tilde{u}\,d\tilde{v}\,P_2^*(\tilde{u}-\tilde{m}D_2, \tilde{v}-\tilde{n}D_2)$$

$$\exp\left[-\frac{jk}{2}\left(\frac{1}{z_2}+\frac{1}{z_3}-\frac{1}{f_2}\right)(\tilde{u}^2+\tilde{v}^2)\right]\exp$$

$$\left\{+jk\left[\tilde{u}\left(\frac{t}{z_3}-\frac{\tilde{m}D_2}{f_2}\right)+\tilde{v}\left(\frac{w}{z_3}-\frac{\tilde{n}D_2}{f_2}\right)\right]\right\}$$

$$\int\int d\xi'd\eta'\,I_o\left(\frac{\xi'}{M},\frac{\eta'}{M}\right)$$

$$h'_1(u-\xi', v-\eta')h'^*_1(\tilde{u}-\xi', \tilde{v}-\eta')$$

This equation can be written as $$I_f(t,w) = \int\int d\xi'd\eta'\,I_o\left(\frac{\xi'}{M},\frac{\eta'}{M}\right) \quad (A15)$$

$$\left|\frac{e^{jkz_1}e^{jkz_3}}{j\lambda z_3 M^2}\exp\left[\frac{jk}{2z_3}(t^2+w^2)\right]\sum_m \sum_n \exp\left\{\frac{-jk}{2f_2}\left[\begin{matrix}(mD_2)^2+\\(nD_2)^2\end{matrix}\right]\right\}\right.$$

$$\int\int du\,dv\,P_2\left(\begin{matrix}u-mD_2,\\v-nD_2\end{matrix}\right)\exp\left[\frac{jk}{2}\left(\frac{1}{z_2}+\frac{1}{z_3}-\frac{1}{f_2}\right)(u^2+v^2)\right]$$

$$\left.\exp\left\{-jk\left[u\left(\frac{t}{z_3}-\frac{mD_2}{f_2}\right)+v\left(\frac{w}{z_3}-\frac{nD_2}{f_2}\right)\right]\right\}h'_1(u-\xi', v-\eta')\right|^2$$

The assumptions related to incoherence allow us to separate the object intensity $I_o$ and pull it outside the magnitude squared in the equation above. The terms within the squared magnitude are all related to parameters of the optical system such as pupils, impulse responses for the main lens and lenslet, etc. If this is considered the system response, we can see that this term performs a separable operation with the object intensity. Specifically, let $$PIF_{\xi',\eta'}^{t,w} = PIF(t, w, \xi', \eta') = \quad (A16)$$

$$\left| \frac{e^{jkz_1} e^{jkz_3}}{j\lambda z_3 M^2} \exp\left[\frac{jk}{2z_3}(t^2 + w^2)\right] \sum_m \sum_n \exp\left\{\frac{-jk}{2f_2}\left[\begin{array}{c}(mD_2)^2 + \\ (nD_2)^2\end{array}\right]\right\} \right.$$
$$\iint dudv P_2\left(\begin{array}{c}u - mD_2, \\ v - nD_2\end{array}\right) \exp\left[\frac{jk}{2}\left(\frac{1}{z_2} + \frac{1}{z_3} - \frac{1}{f_2}\right)(u^2 + v^2)\right]$$
$$\left. \exp\left\{-jk\left[u\left(\frac{t}{z_3} - \frac{mD_2}{f_2}\right) + v\left(\frac{w}{z_3} - \frac{nD_2}{f_2}\right)\right]\right\} h_1'(u - \xi', v - \eta') \right|^2$$

This information about object separability and the lack of a conventional convolution with the system parameters is counter-intuitive. However, following on this separability, the final Eq. (A15) for an incoherent plenoptic image can be re-written in vector-matrix form to enable easy simulation. The term $$I_o\left(\frac{\xi'}{M}, \frac{\eta'}{M}\right)$$

inside the integral refers to a single point in the object. The second term in the integral is represented by Eq. (A16). Thus, it can be seen that this term is a function of the sensor plane coordinates (t, w) as well as the single object point ($\xi'$, $\eta'$). When the entire integral is performed over $\xi'$, $\eta'$ coordinates, we would effectively sum over all the points in an object and the result would be only a function of sensor coordinates, (t, w), thus forming the basis for Eq. (1) of the main text.

APPENDIX B

Example PIF Based on Geometrical Optics

This derivation uses the nomenclature shown in FIG. 1 and the corresponding text. For convenience, the following derivation is one-dimensional. The extension to two dimensions is straightforward. The following definitions are also used:
  $\lambda$ Design wavelength
  D Diameter of primary lens 110
  F Focal length of primary lens 110
  d Diameter of microlens 120
  f Focal length of microlens 120
  k Lenslet counter
  R Radius of curvature of concave microlens surface
  t Thickness of microlens
  n Refractive index of microlens
  W Sensor size
  $\Delta_p$ Size of sensor pixel
  $\delta_x$ Sampling interval in the object plane
  2M Number of object samples One geometrics optics approach is based on ray trace matrices. The basic ray trace matrix for the plenoptic imaging system of FIG. 1 is given by $$S[z_3]L\left[-\frac{1}{f}\right]\{t_{c_k}\}S[z_2]L\left[-\frac{1}{F}\right]\{t_{p*}\}S[z_1] \quad (B1)$$

where S[ ] is the matrix for free space propagation and L[ ] is the matrix for propagation through a lens. Referring to FIG. 1 and starting from the righthand side of expression B1, S[$z_1$] is the propagation from the object 150 to the primary lens 110. $\{t_{p*}\}$ accounts for the lens aperture and filter module 125, if any.

$$L\left[-\frac{1}{F}\right]$$

is propagation through the primary lens 110 and S[$z_2$] is propagation from the primary lens 110 to the lenslet array 120. $\{t_{c_k}\}$ accounts for the aperture of the relevant lenslet in the array, $$L\left[-\frac{1}{f}\right]$$

is propagation through the lenslet and S[$z_3$] is propagation from the lenslet to the sensor. For convenience, wavelength dependence is not shown in Eq. B1. Note that there is some bookkeeping and coordinate shifting since some of the components are arrays of elements. Specifically, the filter module is an arrangement of filter cells and the lenslet array is an array of lenslets. Thus, it must be determined which cell in the filter module and which lenslet in the array is traversed by a ray before the correct ray matrices can be applied.

Eq. B1 is just one approach to tracing rays. Other ray-tracing approaches can also be used. For example, exact ray tracing based on applying Snell's law at each surface can also be used.

Regardless of the specific ray tracing method, ray tracing capability can be used to estimate the PIF matrix. Recall that each value in the PIF matrix is the contribution of one object point/pixel to one point/pixel in the plenoptic image. That contribution can be estimated by tracing rays.

One approach is based on Monte Carlo methods. A large number of rays is traced from an object point. The distribution of rays in angular space is representative of the energy distribution from the object. The number of rays hitting different points in the plenoptic image is indicative of the contribution from that object point. This is repeated for many object points. In this way, the contribution from each object point to each plenoptic image point (aka, the PIF matrix) can be estimated.

Figure 9A:
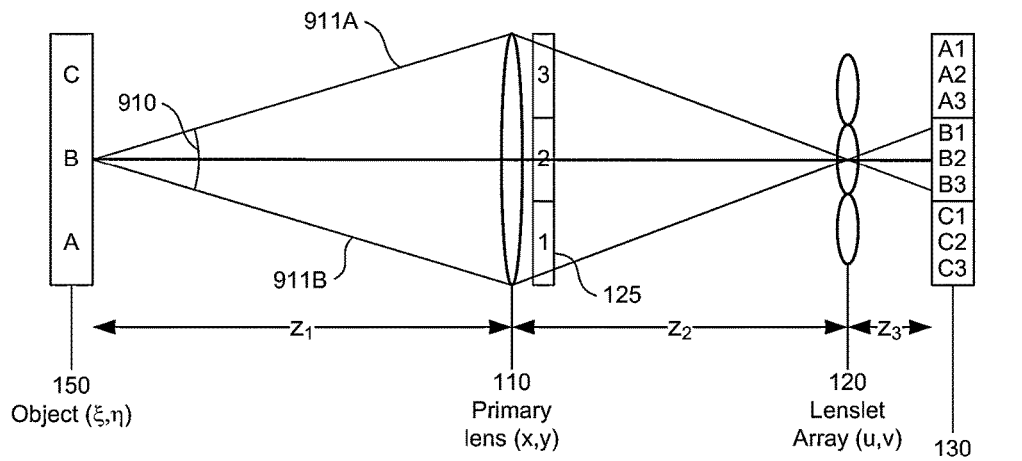
FIGS. 9a-b illustrate determination of the PIF matrix using ray tracing through a filter module.
Figure 9B:
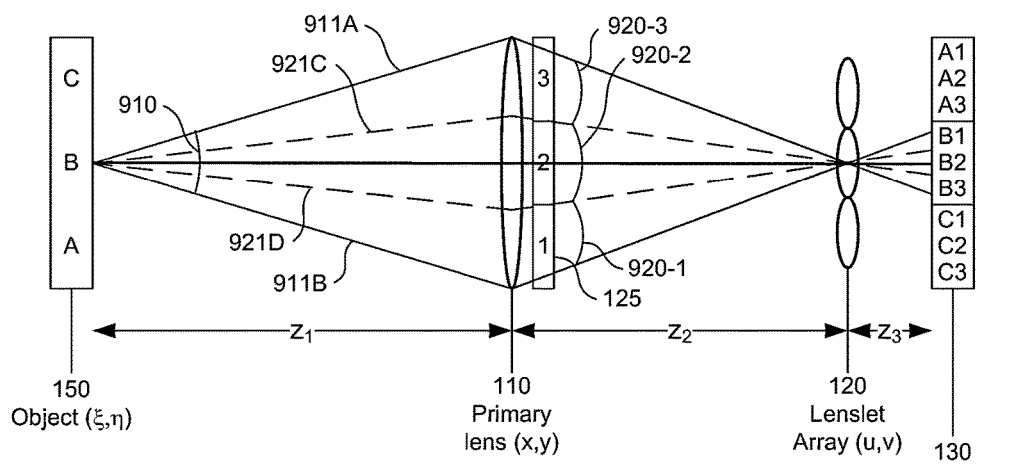

FIGS. 9a-b illustrate another approach based on identifying ray bundles and which ray bundles hit different sensor elements. In this approach, each object point produces a ray bundle 910. These rays traverse through the system and eventually hit different sensor elements. By determining what fraction of the original bundle 910 hits a particular sensor element, we can then determine the corresponding elements in the PIF matrix. This can be accomplished by tracing "border rays." Border rays are the edge rays that define a ray bundle. The ray bundles are chosen so that the distribution of rays within the bundle can be determined without expressly ray tracing them. The identification and tracing of border rays will sometimes involve forward ray tracing and sometimes backward ray tracing.

Consider FIG. 9a. In this case, rays 911A and 911B are border rays for ray bundle 910 since they define the edges of bundle 910. These edge rays are defined by the aperture of primary lens 110. However, when the rays in bundle 910 propagate through filter module 125, not all the rays will be treated the same since each filter cell 1, 2, 3 has a different response. Accordingly, ray bundle 910 is subdivided into ray bundles 920-1, 920-2 and 920-3, as shown by the dashed lines in FIG. 9b. These ray bundles are defined by border rays 921C and 921D, in addition to border rays 911A and 911B. All of these ray bundles 920 propagate through a single lenslet, so no further subdivision of the ray bundles is required due to the lenslet array. Each ray bundle 920 hits the sensor array and the distribution of energy within each ray bundle 920 can be calculated based on its coverage of the sensor array 130.

Figure 10A:
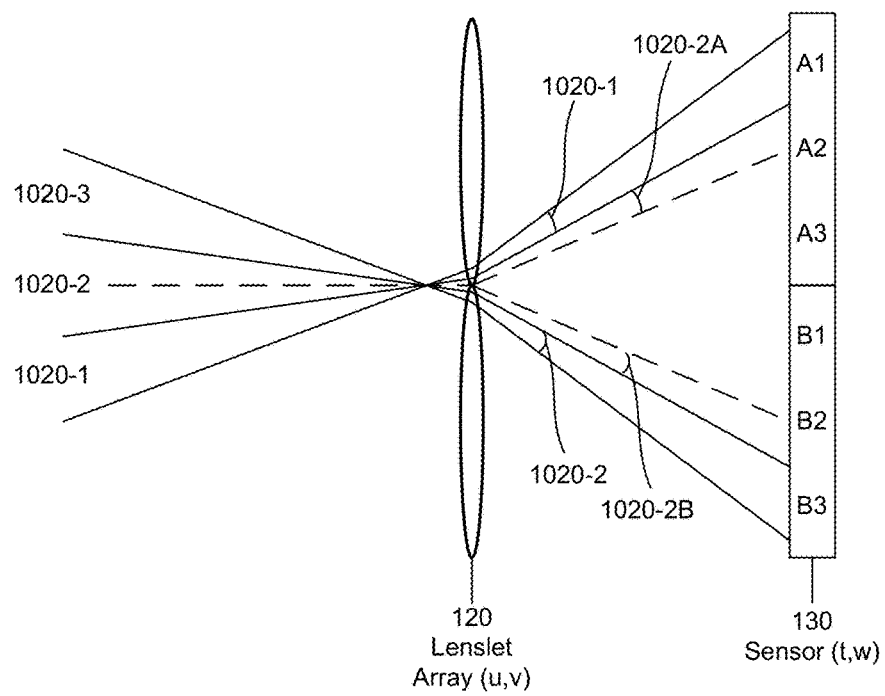
FIGS. 10a-b illustrate determination of the PIF matrix using ray tracing through a lenslet array.

FIG. 10a shows an example where a ray bundle is subdivided because it propagates through more than one lenslet. In FIG. 10a, there are three ray bundles 1020-1, 1020-2 and 1020-3 from the filter module. The solid lines are the border rays defining these three ray bundles. The middle ray bundle 1020-2 hits the border of two lenslets and is split into two ray bundles 1020-2A and 1020-2B. The dashed lines are border rays defining the extent of these two ray bundles.

Figure 10B:
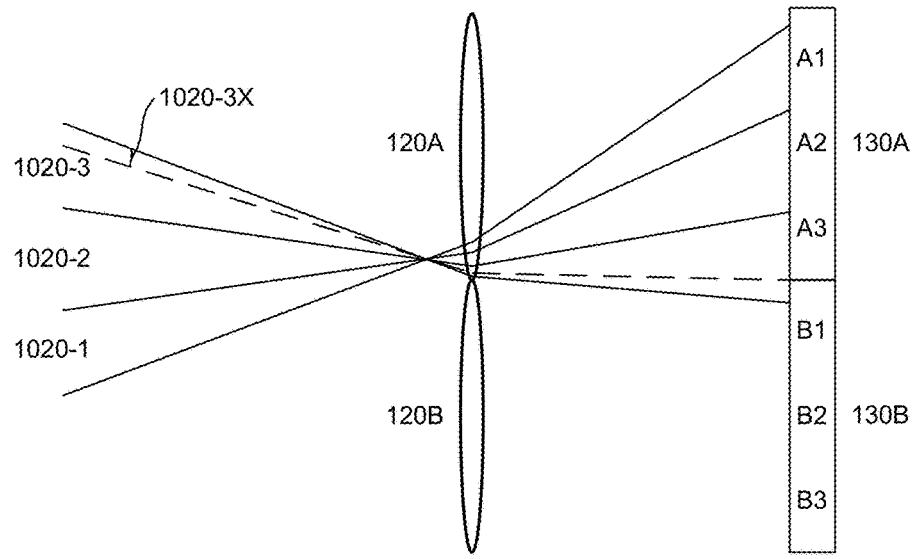

FIG. 10b shows an example where a ray bundle intended for one lenslet spills over into the subimage for an adjacent lenslet. In this example, lenslet 120A corresponds to sensor area 130A (denoted by the rectangle with regions A1, A2 and A3), and lenslet 120B corresponds to sensor area 130B. If there is clean separation between subimages, then all rays that hit lenslet 120A will be directed to sensor area 130A and contribute only to the subimage produced by sensor area 130A. However, in this example, the rays in bundle 1020-3X actually spill over into sensor area 130B. Thus, there is mixing of the subimages produced by sensor areas 130A and 130B. This mixing is modeled in the PIF matrix and, therefore, can be unmixed by the PIF inversion process.

What is claimed is:

1. A computer-implemented method comprising:
    accessing a design of a plenoptic imaging system;
    improving the design of the plenoptic imaging system by iteratively:
        modeling an operation of the plenoptic imaging system based on the design, the operation of the plenoptic imaging system producing plenoptic images of objects, the operation of the plenoptic imaging system modeled by a pupil image function (PIF) that relates an object to the plenoptic image formed by that object;
        modeling reconstructions of the objects from the plenoptic images, said modeling based on applying a PIF inversion process to the plenoptic images;
        calculating a metric from the object reconstructions, the metric related to a spatial resolution of the object reconstructions; and
        modifying the design of the plenoptic imaging system, such modification improving the calculated metric in a manner that improves the spatial resolution of the object reconstructions.

2. The method of claim 1 wherein the object reconstructions include different depth components, and modifying the design comprises modifying the design to improve spatial resolution of the different depth components.

3. The method of claim 2 wherein the different depth components include components located at different depth planes, and modifying the design comprises modifying the design to improve spatial resolution at the different depth planes.

4. The method of claim 3 wherein modeling the operation of the plenoptic imaging system comprises modeling the operation for selected depth planes based on the design of the plenoptic imaging system, and modeling the operation for other depth planes based on interpolating the models for the selected depth planes.

5. The method of claim 1 wherein the object reconstructions include different spectral components, and modifying the design comprises modifying the design to improve spatial resolution of the different spectral components.

6. The method of claim 1 wherein the object reconstructions include different spectral components, and modifying the design comprises modifying the design to reduce mixing of the different spectral components.

7. The method of claim 1 wherein the object reconstructions include different depth and spectral components, and modifying the design comprises modifying the design to improve spatial resolution of the different depth and spectral components.

8. The method of claim 1 wherein the operation of the plenoptic imaging system is modelled by a vector-matrix operation.

9. The method of claim 1 wherein the operation of the plenoptic imaging system is modelled based on wave propagation applied to the design.

10. The method of claim 1 wherein the operation of the plenoptic imaging system is modelled based on geometrical optics applied to the design.

11. The method of claim 1 wherein modifying the design is performed subject to object constraints.

12. The method of claim 1 wherein modifying the design comprises modifying the design to reduce an error between the object reconstructions and the objects.

13. The method of claim 1 wherein the spatial resolution of the object reconstructions is higher than a spatial resolution of plenoptic images captured by the plenoptic imaging system.

14. The method of claim 1, further comprising:
    constructing a plenoptic imaging system according to the modified design.

15. The method of claim 1 wherein the object reconstructions include different spectral components used to detect substances, and modifying the design comprises modifying the design to improve the detection of the substances based on the different spectral components.

16. A non-transitory computer readable medium containing instructions that, when loaded into memory, cause a processor to carry out a method comprising:
    accessing a design of a plenoptic imaging system;
    improving the design of the plenoptic imaging system by iteratively:
        modeling an operation of the plenoptic imaging system based on the design, the operation of the plenoptic imaging system producing plenoptic images of objects, the operation of the plenoptic imaging system modeled by a pupil image function (PIF) that relates an object to the plenoptic image formed by that object;
        modeling reconstructions of the objects from the plenoptic images, said modeling based on applying a PIF inversion process to the plenoptic images;
        calculating a metric from the object reconstructions, the metric related to a spatial resolution of the object reconstructions; and
        modifying the design of the plenoptic imaging system, such modification improving the calculated metric in a manner that improves the spatial resolution of the object reconstructions.

17. The non-transitory computer readable medium of claim 16 wherein the object reconstructions include different depth components, and modifying the design comprises modifying the design to improve spatial resolution of the different depth components.

18. The non-transitory computer readable medium of claim 16 wherein the object reconstructions include different spectral components, and modifying the design comprises modifying the design to improve spatial resolution of the different spectral components.

19. The non-transitory computer readable medium of claim 16 wherein the object reconstructions include different depth and spectral components, and modifying the design comprises modifying the design to improve spatial resolution of the different depth and spectral components.

20. The non-transitory computer readable medium of claim 16 wherein the spatial resolution of the object reconstructions is higher than a spatial resolution of plenoptic images captured by the plenoptic imaging system.

* * * * *